United States Patent [19]

Millington

[11] Patent Number: 4,556,246
[45] Date of Patent: Dec. 3, 1985

[54] CHAIN COMPONENTS

[75] Inventor: Michael J. Millington, Kidderminster, England

[73] Assignee: Parsons Controls Limited

[21] Appl. No.: 568,229

[22] PCT Filed: Apr. 14, 1983

[86] PCT No.: PCT/GB83/00108
§ 371 Date: Dec. 5, 1983
§ 102(e) Date: Dec. 5, 1983

[87] PCT Pub. No.: WO83/03649
PCT Pub. Date: Oct. 27, 1983

[30] Foreign Application Priority Data

Apr. 15, 1982 [GB] United Kingdom ............... 8210973

[51] Int. Cl.⁴ .............................................. B66C 1/12
[52] U.S. Cl. ................................. 294/82.11; 59/93
[58] Field of Search ............... 294/78 R, 78 A, 74, 294/82 R, 76; 59/93, 90, 84, 85, 86, 87, 78; 24/116 R, 230.5 R, 241 SL

[56] References Cited

U.S. PATENT DOCUMENTS

| | | | |
|---|---|---|---|
| 4,062,088 | 12/1977 | Fredriksson | 24/78 AR |
| 4,171,841 | 10/1979 | Rehbein | 53/93 |
| 4,264,097 | 4/1981 | Rehbein | 294/78 R |
| 4,398,387 | 8/1983 | Bary | 53/93 |
| 4,429,526 | 2/1984 | Rehbein | 53/93 |

FOREIGN PATENT DOCUMENTS

| | | | |
|---|---|---|---|
| 940438 | 3/1956 | Fed. Rep. of Germany | 53/93 |
| 2411725 | 9/1975 | Fed. Rep. of Germany | |
| 2802289 | 7/1979 | Fed. Rep. of Germany | 53/93 |
| 2849911 | 5/1980 | Fed. Rep. of Germany | 53/93 |
| 84124 | 2/1920 | Switzerland | |
| 122416 | 9/1927 | Switzerland | 53/93 |
| 14653 | of 1909 | United Kingdom | 53/93 |
| 1555104 | 11/1979 | United Kingdom | 53/93 |

Primary Examiner—James B. Marbert
Attorney, Agent, or Firm—Kemon & Estabrook

[57] ABSTRACT

A chain sling assembly (FIG. 13) includes a main link 2 provided with two separable connector links 14 each carrying two shackles 50 and shortening clutches 66. Each connector link 14 has a first portion 16 profiled to co-act with the main link 2 and a second portion 18 profiled to co-act with the shackles 50, hubs 42 of the first portion 16 extending externally of hubs 44 of the second portion 18 and being connected with a pin 20. The shortening clutches permit adjustment of the free length of a fall portion of chain 83 by engaging a link 81 in a jaw portion 76.

3 Claims, 13 Drawing Figures

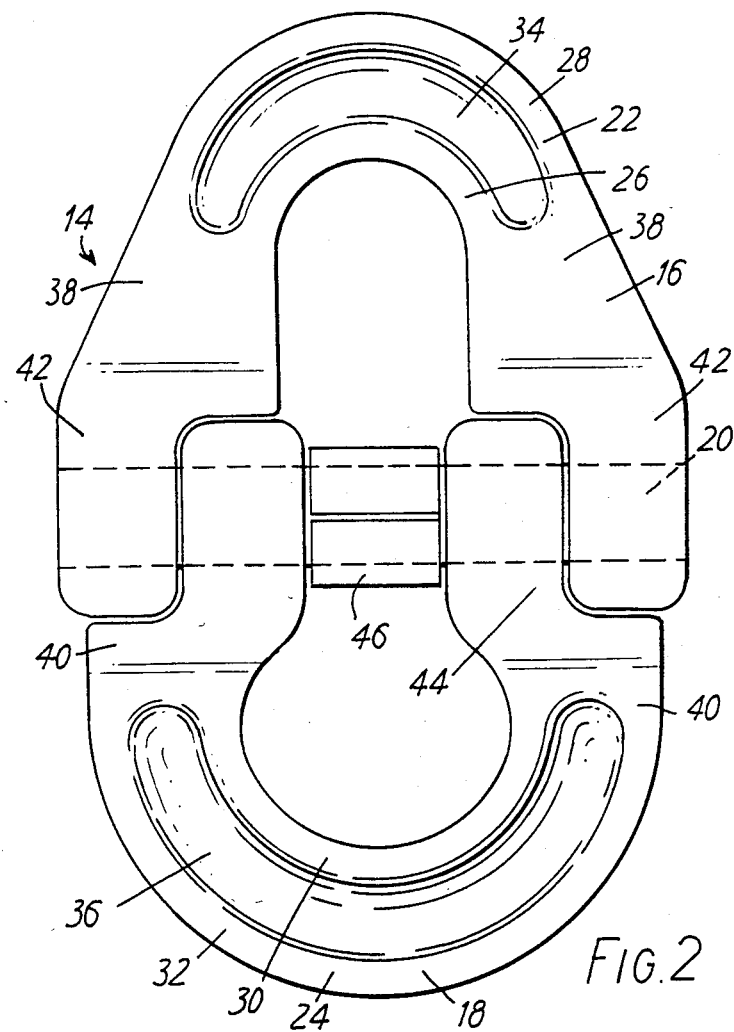
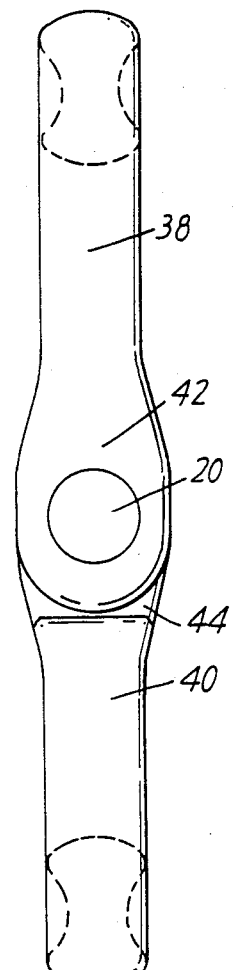
FIG.2
FIG.3
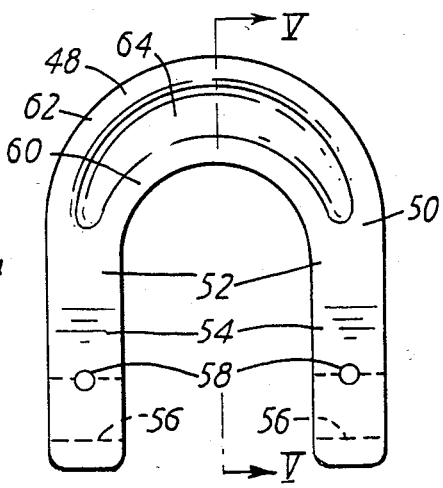
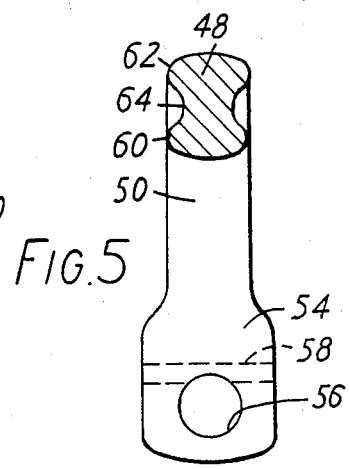
FIG.4
FIG.5

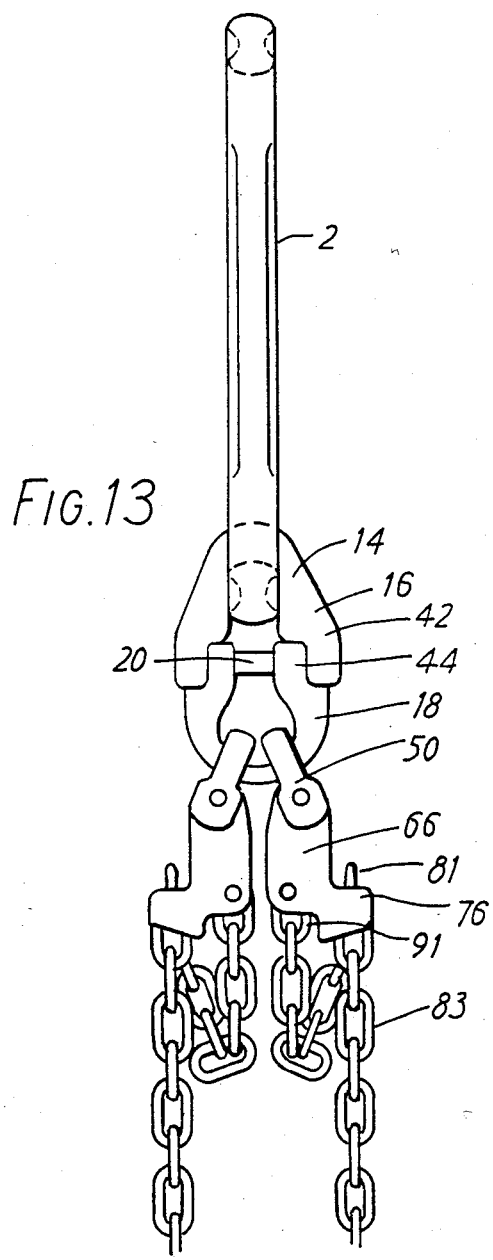

CHAIN COMPONENTS

DESCRIPTION

This invention relates to chain components and, more particularly, to a chain sling assembly.

Such chain sling assemblies include a main link to which is attached a plurality of secondary links and shackles carrying lengths of chain furnished with hook or similar components appropriate to a load to be slung.

Hitherto, it has been the practice to position the secondary links on the main links during the forming process prior to welding up either the main or the secondary link.

According to the present invention there is provided a chain sling assembly having a main link and, as secondary links, separable connector links, each connector link carrying two shackles providing connections for lengths of sling chain.

The invention will now be described, by way of example, with reference to the accompanying partly diagrammatic, drawings of the components of a chain sling assembly in which:

FIG. 2 is a front elevation of a separable connector link;

FIG. 3 is a side elevation of the separable connector link;

FIG. 4 is a front elevation of a shackle;

FIG. 5 is a sectional elevation of the shackle taken on the line V—V of FIG. 4;

FIG. 13 is an elevation of the components connected together to form a chain sling assembly, one of connector link and associated components being omitted for the sake of clarity.

Figure 1:
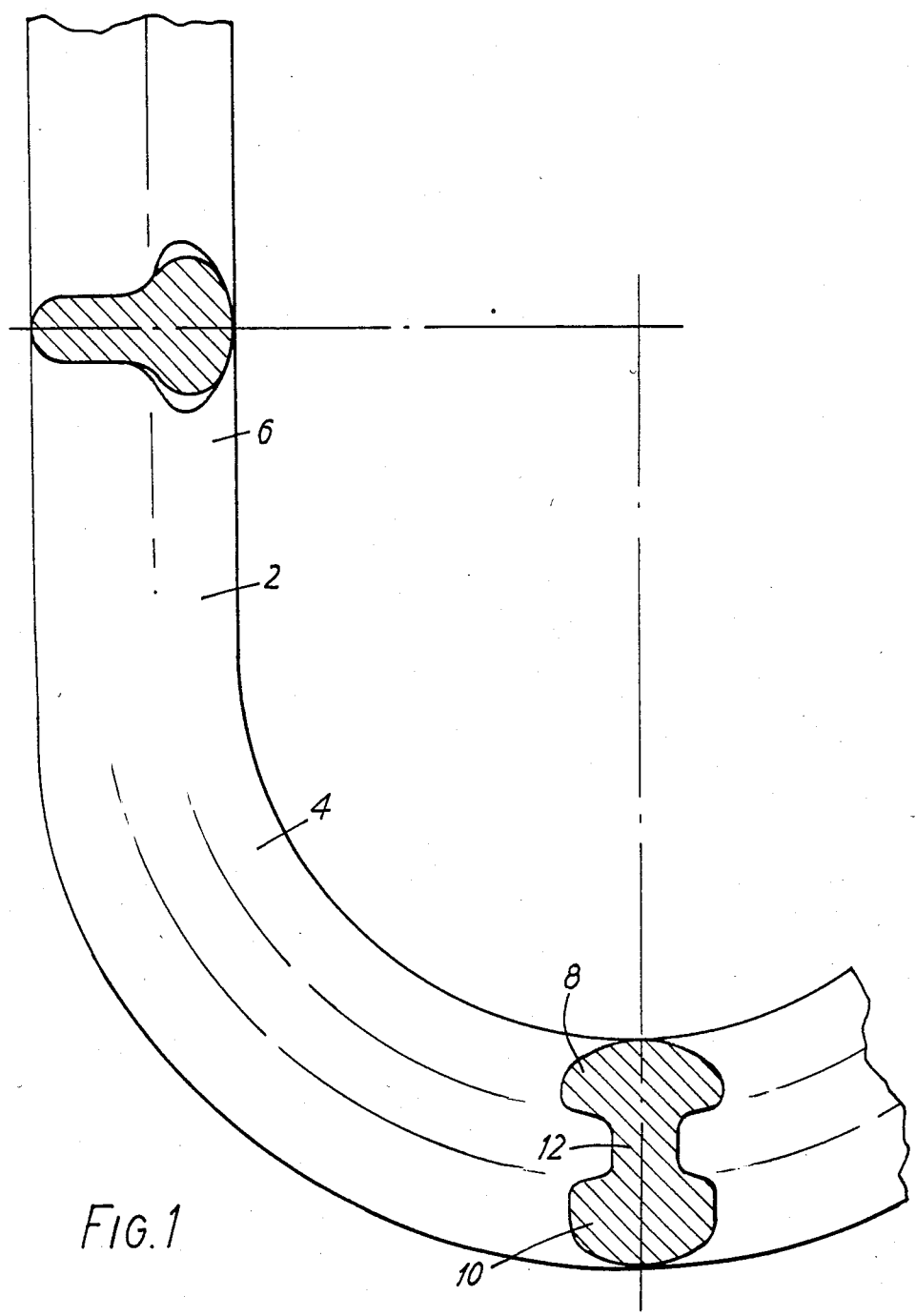
FIG. 1 is a portion of an elongate main link symmetric both about major and minor axes, the cross-sections at those axes being indicated.

As shown in FIG. 1, the elongate main link 2 has crown portions 4 (part only of one of which is shown) of generally semi-circular form connected by parallel extending side portions 6 (part only of one of which is shown). The crown portions 4 are formed with inner and outer, circumferentially extending, flanges 8 and 10 connected by a web 12 extending parallel to a diametrical plane lying centrally of the crown portions 4 as described in our co-pending application Ser. No. PCT/GB 82/00287.

As shown in FIGS. 2 and 3, each connector link 14 includes two half-link portions 16, 18 connected together by means of a pin 20. Each half-link portion 16, 18 includes a crown portion 22, 24 respectively formed with an inner and an outer circumferentially extending flange 26, 28 and 30, 32 connected by a web 34, 36 extending parallel to a diametrical plane lying centrally of the crown portions 22, 24 and parallel side limbs 38, 40 extending from the crown. The side limbs 38, 40 have a thickness equal to that of the webs 34, 36 of the crown portions 22, 24 and progressively increase in width in the diametrical plane lying centrally of the crown portions toward hubs 42, 44 which are bored to receive the connecting pin 20. The hubs 42, 44 are of stepped form, the hubs 42 on the half-link portion 16 being cut away over an inner portion to accommodate the hubs 44 on the other half-link portion 18 which are cut away over an outer portion, thereby permitting the bores to be aligned to receive the connecting pins 20. A retaining clip 46 is positioned on the pin 20 intermediate the inner faces of the hubs 44 to retain the pin in position.

The half-link portion 16 is profiled to seat on the main link 2 with the inner surface of the half-link portion making a close fit with the main link, whilst the other half-link portion 18 is profiled to receive crown portions of two shackles 50, one of which is shown in FIGS. 4 and 5.

Each shackle 50 is formed with a pair of side limbs 52 extending from the crown portions 48 to jaw hubs 54 each formed with a bore 56 for a shackle pin (not shown) and a bore 58 for a retaining pin (not shown). The crown portion 48 is formed with inner and outer circumferentially extending, flanges 60, 62 connected by a web 64 extending parallel to a diametrical plane lying centrally of the crown portion.

Figures 6, 7:
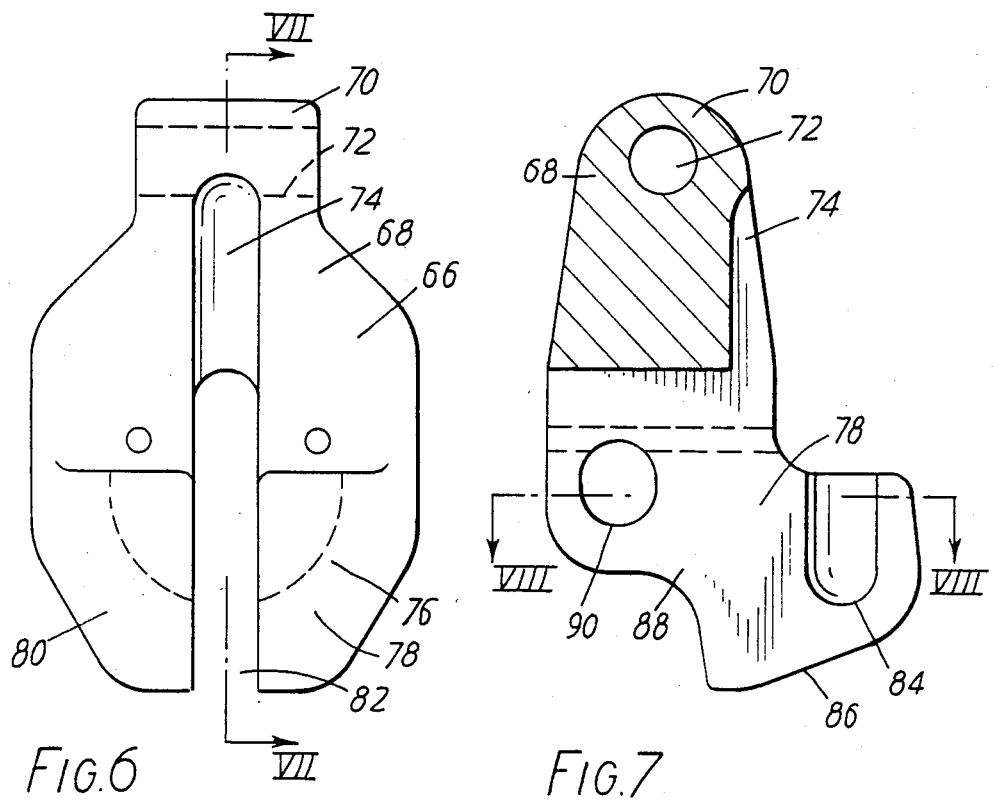
FIG. 6 is a front elevation of a shortening clutch.
FIG. 7 is a sectional elevation of the shortening clutch taken on the line VII—VII of FIG. 6.
Figure 8:
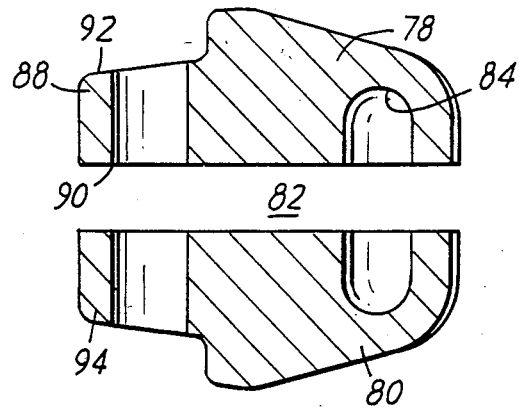
FIG. 8 is a sectional plan view of the shortening clutch taken on the line corresponding to the line VIII—VIII in FIG. 7.
Figure 9:
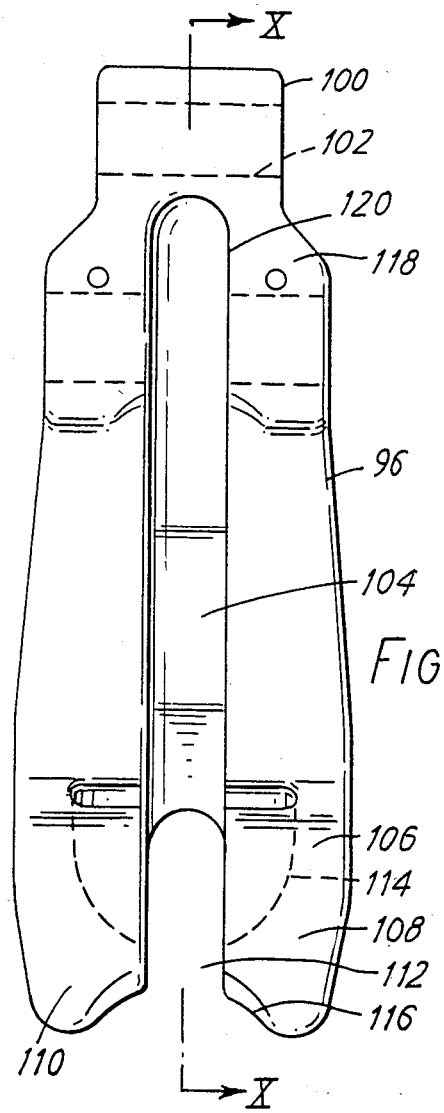
FIG. 9 is a front elevation of an alternative form of shortening clutch.
Figure 10:
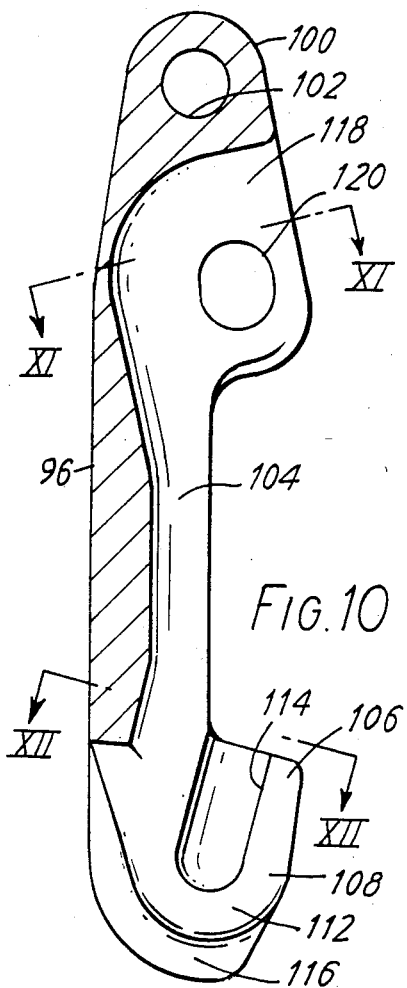
FIG. 10 is a sectional elevation of the alternative form of shortening clutch taken on the line X—X of FIG. 9.
Figure 11:
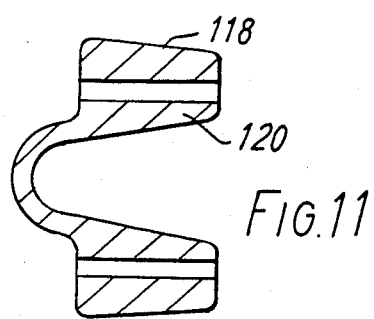
FIGS. 11 and 12 are sectional plan views respectively taken on the lines corresponding to the lines XI—XI and XII—XII in FIG. 10.
Figure 12:
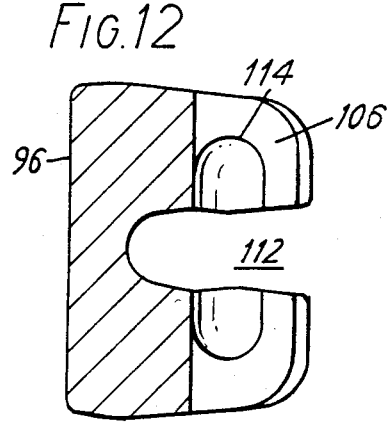

The shortening clutch 66 shown in FIGS. 6, 7 and 8 includes a body portion 68 formed with an end gudgeon 70 arranged to fit between the jaw hubs 54 of the shackle 50 with the shackle pin passing through the bores 56 in the jaw hubs and a bore 72 in the end gudgeon. A longitudinal surface groove 74 extends from adjacent the end gudgeon 70 toward a lobed jaw portion 76, lobes 78, 80 of the lobed jaw portion being spaced apart from a gap 82 forming a continuation of the surface groove. The surface groove 74 and the gap 82 are profiled to accommodate a link 81 of a fall portion of chain 83 (FIG. 13) and inner and outer faces 84, 86 of the lobed jaw portion 76 are profiled to accommodate immediately interlinked links of the fall portion of chain. A body portion 88 is also formed with a clevis connection 90 for an end link 91 of the chain, between raised shoulders 92, 94 on the rear face of the body portion. The free end of the fall length of chain 83 may carry a hook or similar load securing attachment (not shown).

FIGS. 9–12 show an alternative form of shortening clutch 96 having an end gudgeon 100 arranged to fit between the jaw hubs 54 of the shackle 50 with the shackle pin passing through the bores 56 in the jaw hubs and a bore 102 in the end gudgeon. A longitudinal surface groove 104 extends from adjacent the end gudgeon 100 towards a lobed jaw portion 106, lobes 108, 110 of the lobed jaw portion being spaced apart from a gap 112 forming a continuation of the surface groove. The surface groove 104 and the gap 112 are profiled to accommodate a link of a fall portion of chain (not shown) and inner and outer faces 114, 116 are profiled to accommodate immediately interlinked links of the fall portion of the chain. The body portion 118 is formed with a continuation and enlargement of the surface groove 104 adjacent the end gudgeon 100 to provide a clevis connection 120 for an end link of the chain.

As shown in FIG. 13, to assemble the chain sling assembly, the components suitable for the required loading are selected, and connected up together, two connector links 14 (one of which is shown) being positioned on the main link 2 and the shortening clutches 66 or 96 positioned on the connecting links by means of shackles 50. There is thus provided a compact assembly having a relatively low weight which is built up as required from standardised components. Once assembled, the respective pins are secured in position to prevent unauthorised replacement of the components.

The effective lengths of the fall lengths 83 of chain is decreased by engaging a link 81 of the respective chain in the jaw portion of the shortening clutch 66 or 96 to form a loop and thereby shorten the effective length of chain between the shortening clutch and the free end of the chain.

I claim:

1. A chain sling assembly comprising a main link having connector links positioned thereon, each connector link having a pair of shackles positioned thereon, said main link being of unitary construction and having a pair of main link crown portions of generally semi-circular form with parallel extending side limbs connecting said main link crown portions, said connector links being formed with first and second portions each including a crown portion formed with an inner and an outer circumferentially extending flange connected by a web extending parallel to a diametrical plane lying centrally of the crown portion, short parallel side limbs extending from said crown portion, said short parallel side limbs of the second portion being formed with end parts stepped inwardly and the short parallel side limbs of the first portion being formed with end parts stepped outwardly to embrace the end parts of the second portion, the said end parts of each portion being formed with a bore and a connecting pin extending through said bores, said pair of shackles each formed with a pair of parallel extending side limbs connected by a shackle crown portion formed with an inner and an outer circumferentially extending flange connected by a web extending parallel to a diametrical plane lying centrally of the crown portion and having, at their free ends thereof, jaw hubs bored to receive a shackle pin, the crown portion of the first portion of the connector link being profiled to co-act with crown portions of the main link and the crown portion of the second portion of the connector link being profiled to co-act with crown portions of the pair of shackles, the end portions of the side limbs of the first portion of the connector link being spaced apart by a distance corresponding to the thickness of the crown portions of the main link in a direction perpendicular to the diametrical plane lying centrally of the said crown portion, and, the end portions of the side limbs of the second portion of the connector link being spaced apart by a distance corresponding to the thickness of the crown portions of the shackles in a direction perpendicular to the diametrical plane lying centrally of the said crown portion.

2. A chain sling assembly as claimed in claim 1, wherein at least one of the pair of shackles is connected to a shortening clutch assembly having a body portion formed with a bored end gudgeon fitting between the jaw hubs of the respective shackle with the shackle pin passing through the bores in the jaw hubs and in the end gudgeon;

said shortening clutch assembly being formed with a pinned connection for an end link of a chain length and with a seating for an intermediate link of the chain length.

3. A chain sling as claimed in claim 2, wherein the pinned connection for the end link of a chain length is located closely adjacent to the seating for the intermediate link of the chain length.

* * * * *